United States Patent Office 2,969,327
Patented Jan. 24, 1961

2,969,327

DIELECTRIC HEAT SEALING BLANKET

Henry Edward Quehl, Jr., Norwalk, Conn., assignor to E. I. du Pont de Nemours and Company, Wilmington, Del., a corporation of Delaware No Drawing. Filed July 23, 1958, Ser. No. 750,293

5 Claims. (Cl. 252—63.2)

This invention relates to a novel silicone rubber composition suitable for forming into sheets which, because of their unusual electrical properties, are particularly useful as dielectric heat sealing blankets.

Dielectric heat sealing is rapidly gaining popularity in the automobile industry and elsewhere as an efficient method of sealing or laminating thermoplastic sheet materials to backing sheets. An outstanding application of this method has been the fabrication of attractive and durable plastic-surfaced interior car door panels having an embossed upholstered effect. These panels are made by sandwiching a ply of heat-sealable fibrous thermoplastic batting between a ply of a heavy cardboard and a ply of flexible polyvinyl chloride sheeting, followed by embossing and laminating the separate plies in a single operation by means of a die of proper configuration mounted in a device supplying high frequency electric current. As the plastic material to be sealed is heated to its fusion point by the high frequency electric field, mild pressure from the die compresses the batting and bonds the vinyl sheeting to the cardboard backing in predetermined areas, resulting in an embossed or tufted laminated unit.

When the plastic sheeting is relatively thin, about 10 mils or less, or when the batting is relatively thick, it is difficult to heat the thermoplastic plies rapidly to the necessary temperature without resorting to a voltage level which exceeds the dielectric strength of the sheeting, resulting in so-called "blow-hole" resulting from the current arcing across the electrodes and burning holes in the plies between the electrodes.

Another problem encountered in preparing large embossed areas in the laminates is the uneven embossing resulting from uneveness in pressure due to variations in the embossing dies and thickness of the plies being laminated.

To overcome this onerous problem, attempts have been made to provide a flexible compressible sheet material having a high dielectric constant which, when placed between the sealing die (one of the electrodes in an electrical heat sealing device) and a thermoplastic sheeting, will readily become hot and facilitate sealing at a voltage which will not cause the current to arc across the electrodes. But heretofore, a suitable material has not been attained.

The dielectric constant of a medium is defined by "$e$" in the equation:

$$F = \frac{QQ'}{er^2}$$

where "F" is the force of attraction between two charges "Q" and "Q'" separated by a distance "$r$" in a uniform medium.

The dielectric heat sealing art is in urgent need of a good dielectric heat sealing blanket, which is flexible, compressible, heat resistant, strong, and having electrical properties which cause it to heat up readily to the sealing temperatures of the thermoplastic plies to be laminated and prevent arcing of the current between the electrodes of the dielectric heat sealing apparatus.

It is therefore the primary object of this invention to provide a new and improved dielectric heat sealing blanket having the aforementioned essential and desirable combination of properties.

Another object is to provide a method of making such a blanket.

Still other important objects will be readily apparent from the general and detailed description of the invention to follow.

I have discovered that dielectric heat sealing blankets having a dielectric constant greater than any prior art heat sealing blanket known to me can be made by incorporating in a curable silicone gum or rubber composition about 175 to 400 parts of powdered barium titanate filler per 100 parts of silicone rubber, followed by forming the filled composition into a sheet and curing it at an elevated temperature.

In another form of the invention, up to about half of the barium titanate filler is replaced with powdered barium stannate or barium zirconate.

The following specific examples, wherein parts and percents are expressed on a weight basis, are intended to illustrate the invention, but not to define its scope.

*Example 1*

A curable silicone rubber composition is prepared according to the following formula:

| Calendar Composition | Parts by Weight |
|---|---|
| Vinyl substituted organopolysiloxane [1] | 100 |
| Powdered barium titanate ("Ticon" B from National Lead Co.) | 350 |
| Benzoyl peroxide/silicone oil dispersion, ratio 50/50 ("Ludox" AGE from Lucidol Div., Wallace & Tiernan Co.) | 2 |
| | 452 |

[1] (SE33 from General Electric Co., contains about one vinyl group for every 400 methyl groups.)

Preferably, the barium titanate is oven dried at 220° F. for 10 hours before use.

After the silicone gum is broken down on a cold 2-roll rubber mill, the rolls are heated to 220° F. and the barium titanate is thoroughly milled into the gum. The curing agent, that is, the benzoyl peroxide dispersion is next added and thoroughly milled into the composition. The blended curable composition is stored in a dry atmosphere for 30 hours, after which it is remilled for 10 minutes in preparation for calendering.

A layer of the remilled composition is calendered onto a temporary carrier sheet of parachute nylon in an amount corresponding to about 128.5 ounces per square yard, or at a thickness of about 64 mils. Oven dried mica is applied to the exposed surface of the calendered layer to reduce surface tackiness. The nylon-supported layer of uncured silicone rubber compound is sandwiched between two sheets of clay-coated kraft release paper, and this assembly is pressed for 10 minutes between platens heated to 275° F. and under a pressure of 18 pounds per square inch. The release papers and nylon fabric are stripped from the press-cured sheet of silicone rubber, which is then suspended in an oven equipped with a blower for circulating the air. The oven air temperature is gradually raised to 480° F., at which temperature the silicone rubber sheet is fastoon cured for a period of 4 hours.

When fully cured and cooled to room temperature, the product has the following properties:

| | |
|---|---|
| Hardness, Shore A | 35 |
| Tensile strength, 1 in. strip method, lbs | 100 |
| Percent elongation at break | 373 |
| Tear strength, ASTM D-1004-49T lbs. per in. (pendulum and constant elongation type of machine) | 27.3 |
| Weight, ounces per sq. yd | 128.34 |
| Dielectric constant, measured at 14.6 megacycles at 72° F | 14.5 |
| Dielectric dissipation factor | 0.0046 |
| Dielectric loss factor | 0.0667 |

The dielectric dissipation factor and the dielectric loss factor are defined in ASTM D-150-47T.

The silicone rubber sheet material produced in this example is useful as a dielectric heat sealing blanket. When placed between one of the high frequency electrodes, which also serves as an embossing die, and a lay-up of flexible polyvinyl chloride film about 10 mils thick, a heat-sealable fibrous nylon batt and a cardboard backing, the blanket permits the film to be embossed and heat-sealed to the cardboard backing with the nylon batt interposed therebetween at voltages which are harmless to the film. When an electric potential is applied by a high frequency current between the electrodes of the heat-sealing unit, with the lay-up of plies to be laminated and the above described blanket between the electrodes, the blanket is heated to the fusion temperature of the film and nylon batt without any deleterious effect to the blanket.

The blanket, being resilient, compensates for any variations in pressure during the embossing operation that would result from variations in the embossing die or thickness of the plies being laminated.

A control sample sheet for comparison purposes is made by repeating Example 1 except that dry finely divided titanium dioxide is substituted for all of the barium titanate in the above formula. The resulting sheet, has a dielectric constant of only 3.5 and is unsuitable for use in preparing laminates as described above. That is, it fails to heat up sufficiently when subjected to a high frequency electric current under conditions which will not cause arcing of the current between the electrodes.

*Example 2*

Example 1 is repeated, except only 200 parts of barium titanate are used in place of the 350 parts per 100 parts silicone gum. The product has somewhat better strength properties, than that of Example 1, and a dielectric constant of 11.3. It is useful as a dielectric heat sealing blanket.

Suitable dielectric heat sealing blankets are also made by repeating Example 1 except that mixtures of barium titanate and barium zirconate or barium stannate are used in place of the barium titanate alone.

| | Total Parts of Filler Per 100 Parts Silicone Gum | Dielectric Constant of the Filled Film |
|---|---|---|
| Example 3 | 322 barium titanate + 28 barium zirconate | 14.1 |
| Example 4 | 175 barium titanate + 175 barium zirconate | 10.0 |
| Example 5 | 294 barium titanate + 56 barium stannate | 12.7 |
| Example 6 | 175 barium titanate + 175 barium stannate | 9.0 |

The silicone gum used in practicing this invention can be any organopolysiloxane which is convertible to the cured, solid elastic state.

The silicone rubbers useful in practicing this invention are organopolysiloxanes represented by the following empirical formula:

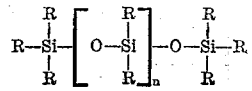

in which substantially all the various "R's" represent monovalent alkyl or aryl hydrocarbon radicals and "$n$" is a whole number greater than 1. The preferred silicone is the one in which substantially all the "R's" represent methyl groups and there is one vinyl group per about 400 methyl groups.

Curing agents for the silicone rubber, other than the one used in the above examples which are useful in practicing this invention include benzoyl peroxide, dichlorobenzoyl peroxide, dicumyl peroxide, ditertiary butyl peroxide, and tertiary butyl perbenzoate.

Benzoyl peroxide or an equivalent curing agent is used in sufficient quantity to cure the silicone gum in accordance with common practice.

The electrical and heat transmitting characteristics of this new blanket material are the surprising result of relatively high loadings of silicone gum with dry powdered barium titanate, or blends thereof with dry powdered barium zirconate or barium stannate. Sufficient of the filler should be added to the silicone gum to result in a dielectric constant of at least 8 and preferably 12 or more in the finished blanket. For most purposes, best results will be obtained when barium titanate is used as the sole filler, in amount of about 250 to 350 parts to each 100 parts of silicone gum. However, useful blanket materials can also be made with as little as about 175 parts or as much as about 400 parts of barium titanate. Electrical properties become borderline below the lower limit of the filler and tear strength becomes poor above the upper limit. However, moderate departures from these limits can be made within the spirit of this invention.

Up to about half of the barium titanate can be replaced with barium zirconate or barium stannate as a secondary filler when the total filler used is about 300 to 400 parts per 100 parts of gum. At lower filler loadings, less of the secondary filler should be used. As the total filler approaches a minimum of about 175 parts per 100 parts of silicone gum, the amount of secondary filler should approach zero.

One skilled in the art can readily arrive at the amount of the specified fillers needed to result in a required dielectric constant value of anywhere from 8 to 14 or more. The composition can also contain limited amounts of ordinary fillers such as titanium dioxide or colloidal silica of the type prepared in a hot gaseous environment. It can also contain other known silicone rubber additives.

The composition is blended, formed into a sheet or other suitable shape, and cured by any convenient method familiar to the silicone rubber art. Best results are obtained when the uncured blended composition is stored or aged for 24 hours or more in a dry atmosphere prior to remilling and sheet formation.

Blanket thickness can be varied to fit the end use. However, a thickness of 60 to 70 mils is useful in laminating polyvinyl chloride films to 10 to 20 mils thick to cardboard backings.

From the foregoing description, it will be seen that the present invention brings about a definite advance in the art of dielectric heat sealing, embossing and laminating. Its desirable properties include good flexibility, compressibility, heat resistance, resistance to tearing, resistance to sticking to hot plastic sheeting, resistance to sticking to heated metal electrodes, and high dielectric constant. In addition to greatly facilitating the sealing of thin plastic sheeting to cardboard, with thick fibrous batting therebetween, at voltage levels which do not puncture holes in the film, its use is also advantageous in many other dielectric sealing situations; for example, when plastic sheeting is sealed to itself, faster heating rates can be obtained when using this blanket.

The utility of this new silicone rubber product is not necessarily limited either to dielectric sealing applications or to sheet form. Because of the cured compositions' exceptional combination of properties, it is expected to find specific uses in the electrical industry wherever a readily moldable, curable heat resistant rubber with such electrical properties is desired.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim as my invention:

1. A composition consisting essentially of a solid cured organopolysiloxane and about 175 to 400 parts of finely divided barium titanate per 100 parts organopolysiloxane, said organopolysiloxane having the following empirical formula:

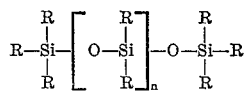

in which substantially all the "R" substituents are selected from the class consisting of monovalent alkyl and aryl hydrocarbon radicals and "n" is a whole number greater than 1.

2. A composition consisting essentially of a solid cured organopolysiloxane and 175–400 parts of a filter per 100 parts of organopolysiloxane, said filler comprising at least 175 parts of finely divided barium titanate as the primary filler and as a secondary filler up to 225 parts of a finely divided material selected from the class consisting of barium stannate and barium zirconate per 100 parts of organopolysiloxane, said organopolysiloxane having the following empirical formula:

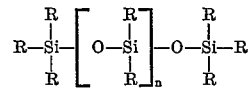

in which substantially all the "R" substituents are selected from the class consisting of monovalent alkyl and aryl hydrocarbon radicals and "n" is a whole number greater than 1.

3. The product of claim 2 in which the organopolysiloxane is a vinyl substituted polysiloxane.

4. The product of claim 2 in which the organopolysiloxane has one vinyl group substitution per about 400 methyl group substitutions.

5. A method making a silicone rubber sheet material adapted for use as a dielectric heat sealing blanket comprising mixing together 100 parts of organopolysiloxane, a curing agent for said organopolysiloxane, about 175–400 parts barium titanate filler, forming said composition into a sheet and curing said sheet by subjecting it to heat and pressure, said organopolysiloxane having the following empirical formula:

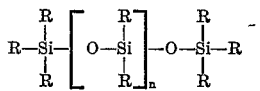

in which substantially all the "R" substituents are selected from the class consisting of monovalent alkyl and aryl hydrocarbon radicals and "n" is a whole number greater than 1.

References Cited in the file of this patent

UNITED STATES PATENTS

| | | |
|---|---|---|
| 2,046,476 | Meissner | July 7, 1936 |
| 2,575,251 | Arnold | Nov. 13, 1951 |
| 2,601,336 | Smith-Johannsen | June 24, 1952 |
| 2,601,337 | Smith-Johannsen | June 24, 1952 |
| 2,617,001 | Hasley | Nov. 4, 1952 |
| 2,641,589 | Chevalier | June 9, 1953 |
| 2,658,882 | Maneri | Nov. 10, 1953 |
| 2,667,437 | Zoubek | Jan. 26, 1954 |
| 2,707,179 | Peyrot et al. | Apr. 26, 1955 |
| 2,723,966 | Youngs | Nov. 15, 1955 |
| 2,763,609 | Lewis et al. | Sept. 18, 1956 |
| 2,875,098 | Blatz | Feb. 24, 1959 |

FOREIGN PATENTS

| | | |
|---|---|---|
| 584,672 | Great Britain | Jan. 21, 1947 |